United States Patent Office 3,055,924
Patented Sept. 25, 1962

3,055,924
PROCESS FOR PREPARING AMINO CARBAMIDES
Armin Hiestand, Binningen, Switzerland, assignor to Ciba Limited, Basel, Switzerland
No Drawing. Filed Dec. 29, 1958, Ser. No. 783,077
Claims priority, application Switzerland Feb. 11, 1958
5 Claims. (Cl. 260—404.5)

This invention provides new cation-active reaction products which contain amide groups and are reaction products of carbamic acid esters or carbonic acid esters with acylation products derived from one molecular proportion of an aliphatic polyamine and at least one molecular proportion of an aliphatic carboxylic acid of high molecular weight, the said acylation products preferably containing hydroxyalkyl groups, and also provides salts of the said reaction products.

The new reaction products correspond, for example, to the probable formula

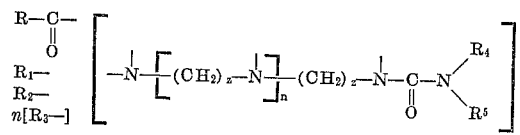

in which R represents an aliphatic hydrocarbon radical of high molecular weight, especially the hydrocarbon radical of a fatty acid containing 11 to 17 carbon atoms, $R_1$, $R_2$, $R_3$ and $R_4$ represent a hydrogen atom or an aliphatic radical of low molecular weight, especially a hydroxyalkyl group containing 2 to 3 carbon atoms, $R_5$ represents a hydrogen atom or a radical of the formula

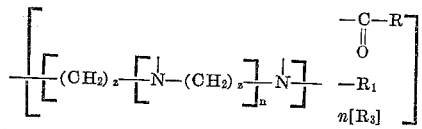

in which R, $R_1$ and $R_3$ have the meanings given above, $n$ is the whole number 1, 2 or 3, and $z$ the whole number 2 or 3.

The new compounds can be obtained by reacting an acylation product, derived from one molecular proportion of a polyamine and one molecular proportion of an aliphatic carboxylic acid of high molecular weight, especially a fatty acid containing 12 to 18 carbon atoms, or a functional derivative of such acid, which acylation product preferably contains hydroxyalkyl groups, with a carbamic acid ester or a carbonic acid ester, and, if required, converting the product so obtained into a salt thereof by reaction with an acid or a quaternating agent.

The polyamines used for making the acylation products used as starting materials may contain besides the hydrocarbon radicals and besides the basic nitrogen atom, further substituents, especially hydroxyalkyl groups.

There may be used, for example, triethylene tetramine or tetraethylene pentamine, or polyamine obtainable by heating an ethylene dihalide with ammonia or an amine, and especially diethylene triamine, and hydroxyalkylation products thereof.

An alkylene oxides of low molecular weight, which can be used for hydroxyalkylation, there may be mentioned propylene oxide and especially ethylene oxide.

As aliphatic carboxylic acids of high molecular weight or functional derivatives thereof, which may be used for making the acylation products there may be mentioned: Caprylic acid, capric acid, oleic acid and especially lauric acid, myristic acid, palmitic acid and stearic acid. As functonal derivatives there may be mentioned the halides, esters or anhydrides of these carboxylic acids.

The carbamic acid esters or carbonic acid esters, which are to be reacted with the acylation products described above, are advantageously lower alkyl esters of carbamic acid or carbonic acid lower dialkyl esters, such as methyl-urethane, urethane, carbonic acid dimethyl ester or carbonic acid diethyl ester.

The new products are made by heating the starting materials, that is to say, carbamic or carbonic acid esters and the acylation product, if desired, in the presence of a solvent, such as an aromatic hydrocarbon or of a catalyst, such as boric acid or toluene sulfonic acid.

The products can be converted into salts with the usual inorganic or organic acids, such as hydrochloric acid, sulfuric acid, formic acid, malic acid, diglycollic acid, lactic acid or citric acid. There may also be used aminodiacetic acid or ethylene-diaminotetracetic acid. Quaternary ammonium salts can be prepared by treating the products with the usual alkylating or aralkylating agents, such as methyl iodide, dimethyl sulfate or benzyl chloride. In the form of salts the products are either soluble in water or easily dispersible therein. The new compounds are suitable as foaming ingredients and detergents in hair shampoos. It is known that the presence of cation-active compounds in detergent preparations for the hair is preferred to that of anion-active detergents because the former favorably influence the properties of the hair. The feel, softness and combability of the hair are improved. The hair acquires a beautiful gloss, and impoverished and attacked hair is fixed so as to facilitate its further treatment. In addition to these advantages the cation-active compounds hitherto used for these purposes, as compared with anion-active products, have the disadvantage that solutions containing them foam insufficiently or that when hair is rinsed with water, after being washed with a shampoo solution containing a cation-capillary active compound, salve-like water-insoluble precipitates are formed which paste the hair or render it sticky, especially in the case of the long hair of a woman. Apparently this sticky effect ("poissage") is produced in conjunction with the anion-active constituents of the dirt in human hair.

It has been unexpectedly found that the new reaction products of this invention do not possess the disadvantages associated with known cation-active compounds. In addition to their excellent foaming power and the absence or only very slight occurence of the troublesome sticking effect in washing human hair, the new products are further distinguished by their good tolerability by the skin.

The invention therefore also includes cosmetic preparations, especially hair detergents that foam well, are free from the sticking effect and are well tolerated by the skin, which comprise a cation-active reaction product containing amide groups and derived from a carbamic acid ester or carbonic acid ester and an acylation product of one molecular proportion of an aliphatic polyamine with at least one molecular proportion of an aliphatic carboxylic acid of high molecular weight, the said acylation product preferably containing hydroxyalkyl groups, or a salt of such reaction product, and, if desired, an inert diluent, carrier or other addition customary in cosmetic preparations.

The hair detergent preparation or other cosmetic preparation may be made by simple mixing and dissolution of the ingredients. A single member of one class of compounds or a mixture of two or more compounds of one class may be used. Other additions customary in hair detergent preparations, such as perfumes, dyestuffs, blonding agents, or thickening agents may be added. There are advantageously added to the preparations of this invention water-soluble non-ionic compounds derived from a mercapto-compound containing a non-aromatic radical containing at least 10 carbon atoms. Such non-ionic water-soluble aliphatic mercaptan derivatives may be derived, for example, from dodecyl, hexadecyl or octadecyl mercaptan. There are advantageously used alkylene oxide condensation products thereof, especially ethylene oxide condensation products. An especially suitable product is the compound obtainable by reacting tertiary dodecyl mercaptan with ethylene oxide, and which compound has a turbidity point of about 69° C. in a solution of 0.115% strength.

There may also be used fatty acid alkanolamides, for example, coconut oil fatty acid hydroxyethylamide. The new preparations may be made up in solid, pasty or liquid form. They are used by known methods for treating hair.

The following examples illustrate the invention:

*Example 1*

220 grams (1 mol) of coconut oil fatty acid are condensed with 192 grams (1 mol) of N:N′-dihydroxyethyl-diethylene triamine in boiling xylene in the presence of 1% of toluene sulfonic acid calculated on the fatty acid. The water liberated is collected in a water separator. The reaction is finished when approximately 1 mol of water has been separated.

The xylene is distilled off in vacuo and the last traces of xylene are removed by heating the mixture for about 2 hours at 120° C. under 15 mm. pressure.

394 grams (approximately 1 mol) of the acylation product so obtained are mixed with 93.5 grams (1.05 mols) of carbamic acid ethyl ester, and the mixture is heated, while stirring, for 15 hours at 145–150° C. in a gentle current of nitrogen. The gas withdrawn is then passed through a condenser, a coil cooled with a mixture of ice and sodium chloride, and then through two vessels containing 4 N-sulfuric acid. At the end of the reaction 45 grams (approximately 1 mol) of ethanol are present in the coiled tube. The sulfuric acid in both receivers can be completely back-titrated with caustic soda solution, so that no ammonia is split off during the reaction. Titration with hydrochloric acid shows that the product has lost approximately 1 mol of basic amino groups, so that the product obtained has the probable formula

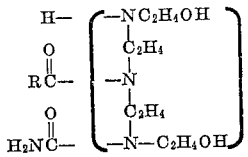

(R=residue of coconut oil fatty acid.)

By using, instead of about 1 mol of the carbamic acid ethyl ester, a large excess thereof there is obtained a product containing only 0.7 mol of basic amino groups. Aqueous solutions of this product exhibit flocculent deposits after a short time.

With the reaction product obtained as described in the first three paragraphs of this example, which product is a brownish strongly viscous mass, a shampoo having the following composition may be prepared.

9 grams of the reaction product are mixed with 10 grams of a water-soluble reaction product of 1 mol of tertiary dodecyl-mercaptan with 8–12 mols of ethylene oxide and with 6 grams of lactic acid of 90% strength, and the whole is made up to 100 grams with water. When 2.7 cc. of the resulting solution is used to wash 10 grams of uniformly soiled raw wool, which has been wetted with 30 grams of water, only a moderate cleansing action and moderate development of foam are obtained after washing twice. On the other hand, when human hair is washed with the usual quantity, for example, twice with 5 cc., of the solution the hair is washed very clean, this time much foam being formed. The foam is composed of fine bubbles and is very stable. Furthermore, the so-called sticky effect, a pasting of the hair in the usual after-washing by rinsing with water, is not observed. The absence of the sticky effect can also be observed with hair in vitro, when the hair has been artificially soiled with a certain amount, for example, 3 or 10% oleic acid. The strength of the sticking action of a cation-active substance can be determined by counting the number of times it is necessary to wash and rinse hair (for example, 18 grams) soiled with 3 or 10% of oleic acid with a certain quantity (for example, 5 cc.) of a shampoo containing the cation-active substance, until the hair neither sticks nor smells of oleic acid.

Shampoos having similar properties are obtained by using, instead of 6 grams of lactic acid, a mixture of 2 grams of hydrochloric acid of 36% strength and 3 grams of lactic acid, or 7 grams of one of the following acids: Citric acid, tartaric acid, malic acid, imino-diacetic acid, diglycollic acid and ethylene-dimaino-tetracetic acid.

*Example 2*

1 mol of coconut oil fatty acid is condensed with 1 mol (148 grams) of N-hydroxyethyl-diethylene triamine in boiling xylene in the presence of toluene sulfonic acid. The condensation product is a yellowish mass resembling white petroleum jelly, which dissolves clearly in dilute acetic acid.

350 grams of the above condensation product are mixed with 93.5 grams (1.05 mols) of carbamic acid ethyl ester and the mixture is heated for 20 hours at 145–150° C. in a current of nitrogen.

There is obtained a brownish viscous substance having the probable formula

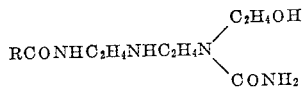

(R=residue of coconut oil fatty acid.)

The reaction product can be used for making a hair shampoo in a manner analogous to that described in Example 1. Such a shampoo also shows practically no sticky effect.

*Example 3*

394 grams (approximately 1 mol) of the acylation product obtained as described in the first paragraph of Example 1 are mixed with 62 grams (0.525 mol) of diethyl carbonate, and the mixture is heated, while stirring, for 15 hours at 110° C. in a gentle current of nitrogen. The reaction melt is then heated in the course of 10–12 hours up to 125° C. and then for a further 8 hours at 150° C. The gas withdrawn is passed through a condenser and a coiled receiver cooled with a mixture of ice and sodium chloride. 52 grams of a liquid are collected which can be split up by distillation into 44 grams of alcohol and 8 grams of water-insoluble carbonic acid diethyl ester. Titration with hydrochloric acid shows that the reaction product contains little more than half of the basic amino groups present in the starting material. The product obtained therefore corresponds to the probable formula

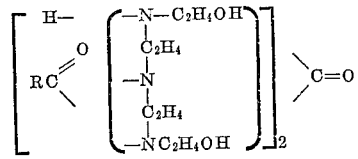

(R=residue of coconut oil fatty acid.)

A shampoo of the following composition can be prepared with the reaction product described above:

9 grams of the reaction product, 7 grams of citric acid and 10 grams of a water-soluble reaction product of 1 mol of tertiary dodecyl-mercaptan with 8–12 mols of ethylene oxide, and 74 grams of water are mixed together with slight heating to form a clear solution.

This shampoo washed living hair clean substantially without producing any sticky effect.

Shampoos having similar properties are obtained by using, instead of citric acid, the same quantity of tartaric acid, or lactic acid of 90% strength or a mixture of these acids with an inorganic acid, such as hydrochloric acid, phosphoric acid or sulfuric acid. The quantity of acid added being so chosen in each case that the reaction of the shampoo solution is not acid to Congo.

*Example 4*

272 grams (1 mol) of commercial stearic acid are reacted with 234 grams (1 mol) of N:N'-dihydroxyethyl triethylene tetramine in boiling xylene in the presence of 1% of toluene sulfonic acid (calculated on the weight of the fatty acid). The reaction is finished, when 1 mol of water has been collected in a water separator. The xylene is then distilled off in vacuo, and in order to remove the last traces of the solvent the reaction mixture is maintained for 2 hours at 120° C. under 15 mm. pressure.

483 grams (1 mol) of the acylation product so obtained are mixed with 93.5 grams (1.05 mols) of carbamic acid ethyl ester, and the whole is heated, while stirring, for 15 hours at 145–150° C. in a gentle current of nitrogen. Alcohol distils off during the reaction.

By mixing 9 grams of the reaction product, 10 grams of a water-soluble reaction product of 1 mol of tertiary dodecyl mercaptan with 8–12 mols of ethylene oxide, 7 grams of citric acid and 74 grams of water and slightly warming the mixture a clear solution is obtained. In a first and a second washing with 5 cc. of the latter solution each time, human hair, which has been soiled artificially with oleic acid, is washed completely clean with the development of a good foam and substantially without producing any sticky effect.

What is claimed is:

1. A process for the preparation of new amino-carbamides, which comprises condensing A) a member selected from the group consisting of a carbamic acid lower alkyl ester and a carbonic acid lower alkyl ester with B) an acylation product condensate of (*a*) 1 molecular proportion of a lower alkylene polyamine containing 3 to 5 nitrogen atoms and containing as the sole substituents at most 2 nitrogen-bonded hydroxyethyl radicals with (*b*) one molecular proportion of an acid of the formula R—COOH, wherein R is an acyclic hydrocarbon radical having from 11 to 17 carbon atoms.

2. A process for the preparation of new amino-carbamides, which comprises condensing A) a member selected from the group consisting of a carbamic acid lower alkyl ester and a carbonic acid lower alkyl ester with B) an acylation product as is obtained by condensing (*a*) 1 molecular proportion of a member selected from the group consisting of N-hydroxyethyl-diethylene triamine, N,N'-dihydroxyethyl-diethylene triamine and N,N'-dihydroxyethyl triethylene tetramine with (*b*) one molecular proportion of an acid of the formula R—COOH, wherein R is an acyclic hydrocarbon radical having from 11 to 17 carbon atoms.

3. A process for the preparation of new amino-carbamides, which comprises condensing 1 molecular proportion of carbamic acid ethyl ester with one molecular proportion of the acylation product obtained by condensing equimolecular proportions of coconut oil fatty acid and N-hydroxyethyl-diethylene triamine.

4. A process for the preparation of new amino-carbamides, which comprises condensing 1 molecular proportion of carbamic acid ethyl ester with one molecular proportion of the acylation product obtained by condensing equimolecular proportions of coconut il fatty acid and N:N'-dihydroxyethyl-diethylene triamine.

5. A process for the preparation of new amino-carbamides, which comprises condensing 1 molecular proportion of carbonic acid diethyl ester with two molecular proportions of the acylation product obtained by condensing equimolecular proportions of coconut oil fatty acid and N:N'-dihydroxyethyl-diethylene triamine.

References Cited in the file of this patent
UNITED STATES PATENTS
2,304,113   Morgan _____ Dec. 8, 1942